United States Patent
Shelton, IV et al.

(10) Patent No.: US 12,433,589 B2
(45) Date of Patent: Oct. 7, 2025

(54) LEARNED TRIGGERS FOR ADAPTIVE CONTROL OF SURGICAL STAPLING SYSTEMS

(71) Applicant: Cilag GmbH International, Zug (CH)

(72) Inventors: Frederick E. Shelton, IV, Hillsboro, OH (US); Shane R. Adams, Lebanon, OH (US); Nicholas J. Ross, Franklin, OH (US); Kevin M. Fiebig, Cincinnati, OH (US); Matthew D. Cowperthwait, Cincinnati, OH (US); Taylor W. Aronhalt, Loveland, OH (US)

(73) Assignee: Cilag GmbH International, Zug (CH)

( * ) Notice: Subject to any disclaimer, the term of this patent is extended or adjusted under 35 U.S.C. 154(b) by 0 days.

(21) Appl. No.: 18/379,763

(22) Filed: Oct. 13, 2023

(65) Prior Publication Data
US 2025/0120711 A1    Apr. 17, 2025

(51) Int. Cl.
*A61B 17/072*    (2006.01)
*A61B 17/00*    (2006.01)

(52) U.S. Cl.
CPC .......... *A61B 17/07207* (2013.01); *A61B 2017/00398* (2013.01); *A61B 2017/07214* (2013.01); *A61B 2017/07271* (2013.01)

(58) Field of Classification Search
CPC .... A61B 17/07207; A61B 2017/00398; A61B 2017/07214; A61B 2017/07271
See application file for complete search history.

(56) References Cited

U.S. PATENT DOCUMENTS

| | | | |
|---|---|---|---|
| 9,072,535 B2 * | 7/2015 | Shelton, IV | A61B 17/105 |
| 10,292,704 B2 * | 5/2019 | Harris | H01M 10/425 |
| 10,835,245 B2 | 11/2020 | Swayze et al. | |
| 11,576,677 B2 | 2/2023 | Shelton, IV et al. | |
| 2009/0209979 A1 * | 8/2009 | Yates | F16D 27/004 606/143 |
| 2011/0022032 A1 * | 1/2011 | Zemlok | A61B 17/07207 606/1 |
| 2014/0200612 A1 * | 7/2014 | Weir | A61B 90/98 227/176.1 |
| 2014/0239043 A1 * | 8/2014 | Simms | A61B 17/07207 227/176.1 |
| 2014/0277017 A1 * | 9/2014 | Leimbach | A61B 17/32 227/175.3 |
| 2016/0100839 A1 * | 4/2016 | Marczyk | A61B 17/07207 227/176.1 |
| 2017/0189018 A1 * | 7/2017 | Harris | G01R 31/374 |
| 2018/0235609 A1 * | 8/2018 | Harris | A61B 17/07207 |
| 2018/0235610 A1 * | 8/2018 | Harris | A61B 17/072 |

(Continued)

OTHER PUBLICATIONS

"IEEE 802.3 Standard", published Dec. 2008.
"ATM-MPLS Network Interworking 2.0", published Aug. 2001.
U.S. Appl. No. 17/958,037, filed Sep. 30, 2022.

*Primary Examiner* — Gloria R Weeks
*Assistant Examiner* — Mobeen Ahmed

(57) ABSTRACT

A surgical system for use in a surgical procedure to perform sequential firings of staple cartridges is disclosed. A control circuit is to monitor a parameter indicative of a tissue response associated with a first firing, assess the tissue response based on the parameter, and adjust an operational parameter associated with a second firing based on the tissue response during the first firing.

19 Claims, 7 Drawing Sheets

(56) References Cited

U.S. PATENT DOCUMENTS

| | | | |
|---|---|---|---|
| 2018/0235611 A1* | 8/2018 | Harris | A61B 17/07207 |
| 2018/0235619 A1* | 8/2018 | Harris | A61B 17/07207 |
| 2018/0325516 A1* | 11/2018 | Harris | A61B 17/282 |
| 2019/0159776 A1* | 5/2019 | Ingmanson | A61B 17/1155 |
| 2019/0200981 A1* | 7/2019 | Harris | H04N 7/183 |
| 2019/0201042 A1* | 7/2019 | Nott | A61B 34/76 |
| 2019/0201081 A1* | 7/2019 | Shelton, IV | G06F 11/00 |
| 2019/0201146 A1* | 7/2019 | Shelton, IV | A61B 17/07207 |
| 2019/0206563 A1* | 7/2019 | Shelton, IV | A61B 34/20 |
| 2019/0247045 A1* | 8/2019 | Park | A61B 17/072 |
| 2020/0205825 A1* | 7/2020 | Vendely | A61B 17/072 |
| 2020/0405311 A1* | 12/2020 | Shelton, IV | G06K 19/07758 |
| 2021/0085316 A1* | 3/2021 | Harris | G16H 20/40 |
| 2021/0196381 A1* | 7/2021 | Eckert | A61B 90/361 |
| 2022/0249097 A1* | 8/2022 | Shelton, IV | G16H 50/20 |

\* cited by examiner

LEARNED TRIGGERS FOR ADAPTIVE CONTROL OF SURGICAL STAPLING SYSTEMS

SUMMARY

The present disclosure provides a surgical system. The surgical system is for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is to motivate the drive shaft to effect a firing motion at the end effector and the control circuit is to monitor a parameter indicative of a tissue response associated with the first firing, assess the tissue response based on the parameter, and adjust an operational parameter associated with the second firing based on the tissue response during the first firing.

The present disclosure provides a surgical system. The surgical system is for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is configured to motivate the drive shaft to effect a firing motion at the end effector, and the control circuit is to detect a tissue response associated with the first firing, and adjust a setting of the surgical system for use with the second firing based on the tissue response during the first firing.

The present disclosure provides a surgical system. The surgical system is for use in a surgical procedure to perform sequential firings of staple cartridges. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is configured to motivate the drive shaft to effect a firing motion at the end effector, and the control circuit is to detect that the surgical procedure involves sequential firings, wherein the sequential firings include a first firing that deploys first staples into a first tissue portion from a first staple cartridge, and a second firing that deploys second staples into a second tissue portion from a second staple cartridge, update a firing algorithm previously utilized with the first firing based on a tissue response during the first firing, and execute the updated firing algorithm in the second firing.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
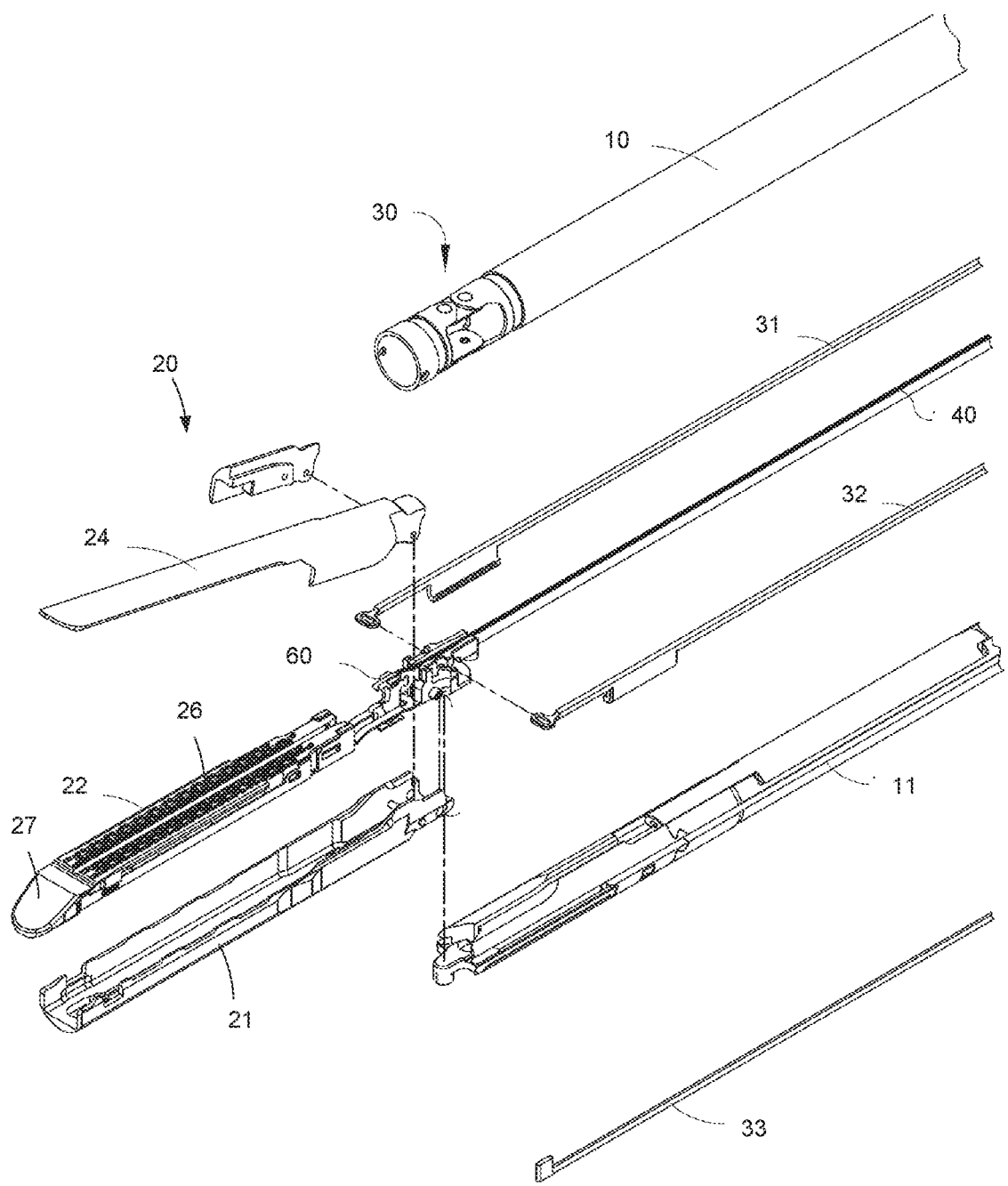

The methods, devices, and systems disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates an exploded view of an end effector and a shaft portion of a surgical stapling system, in accordance with the present disclosure.

Figure 2:
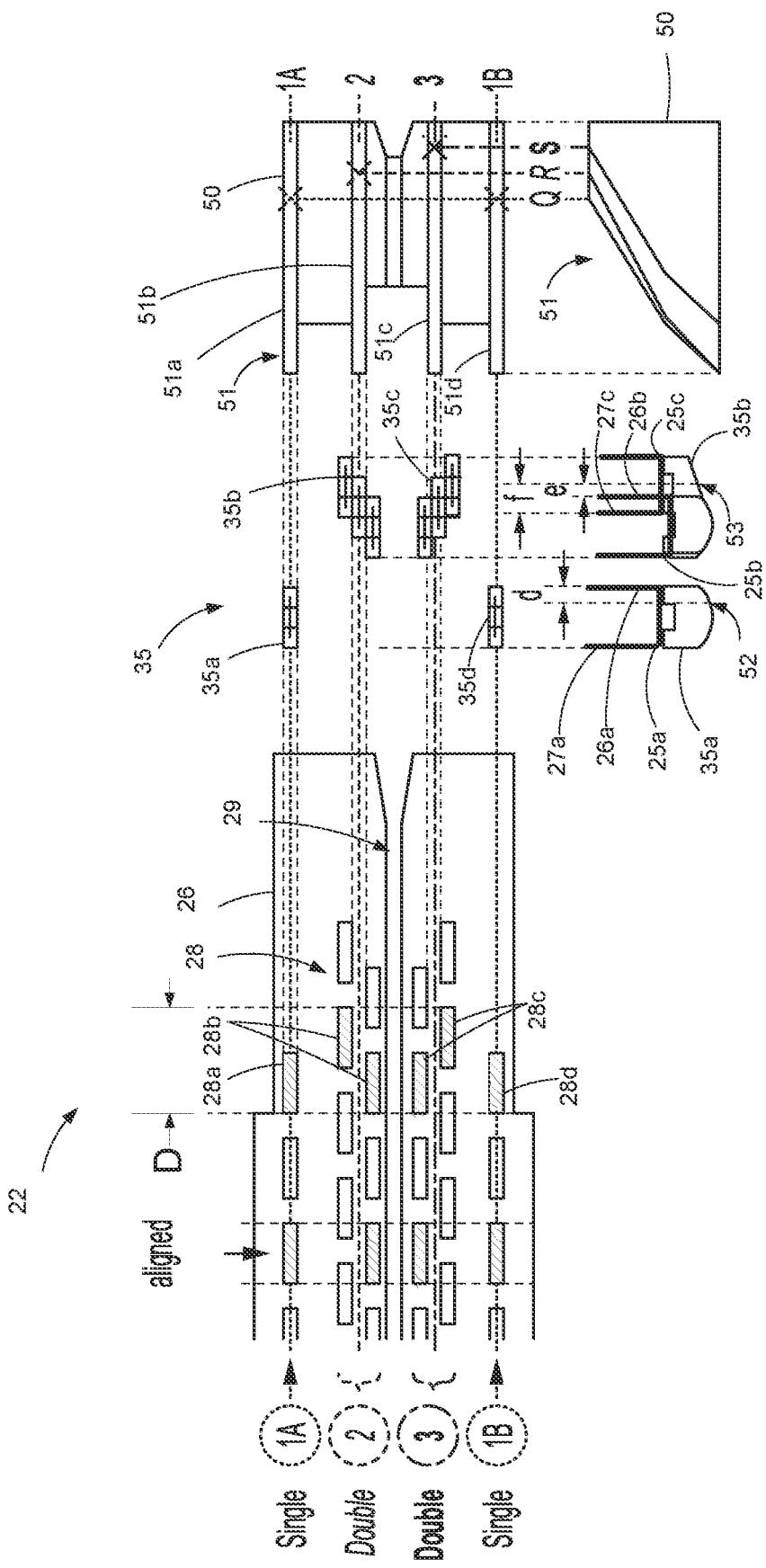

FIG. 2 is a diagram illustrating components of a staple cartridge, in accordance with the present disclosure.

Figure 3:
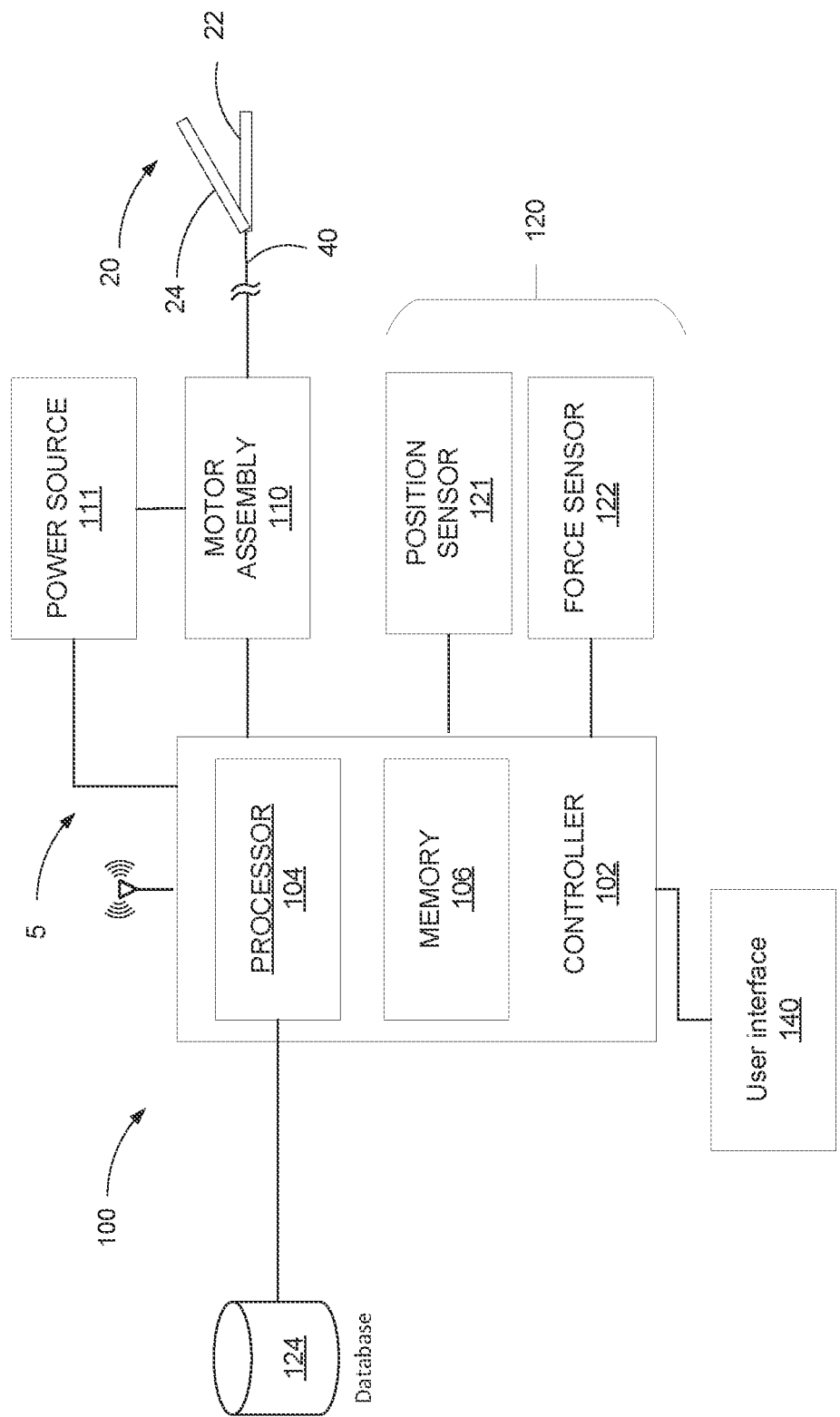

FIG. 3 is a diagram illustrating various components of a surgical stapling system, in accordance with the present disclosure.

Figure 4:
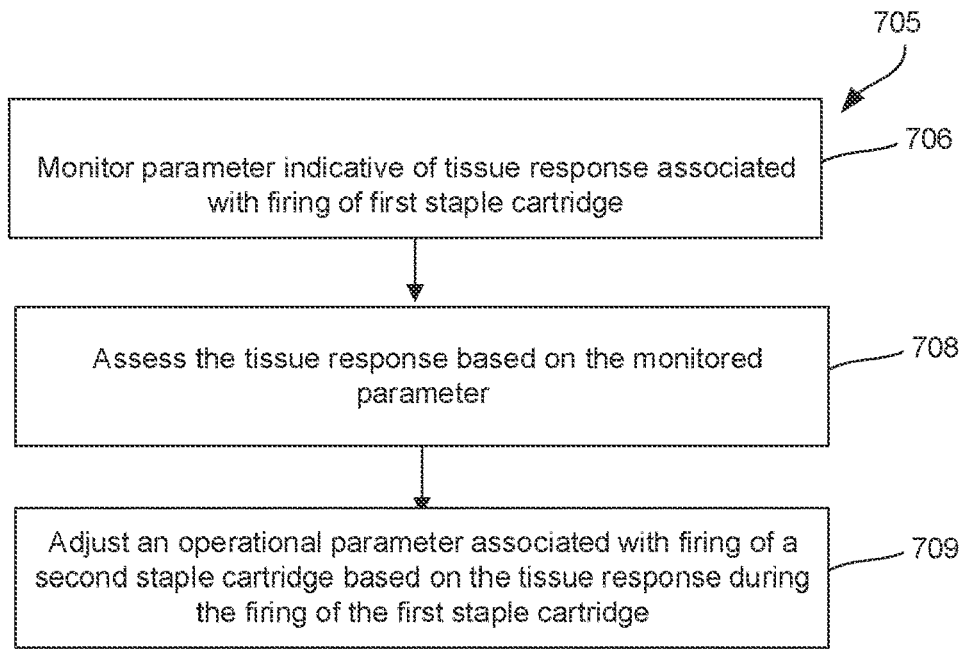

FIG. 4 is flow diagram illustrating a logic configuration of a method for adjusting operational parameters of a surgical stapling system, in accordance with the present disclosure.

Figure 5:
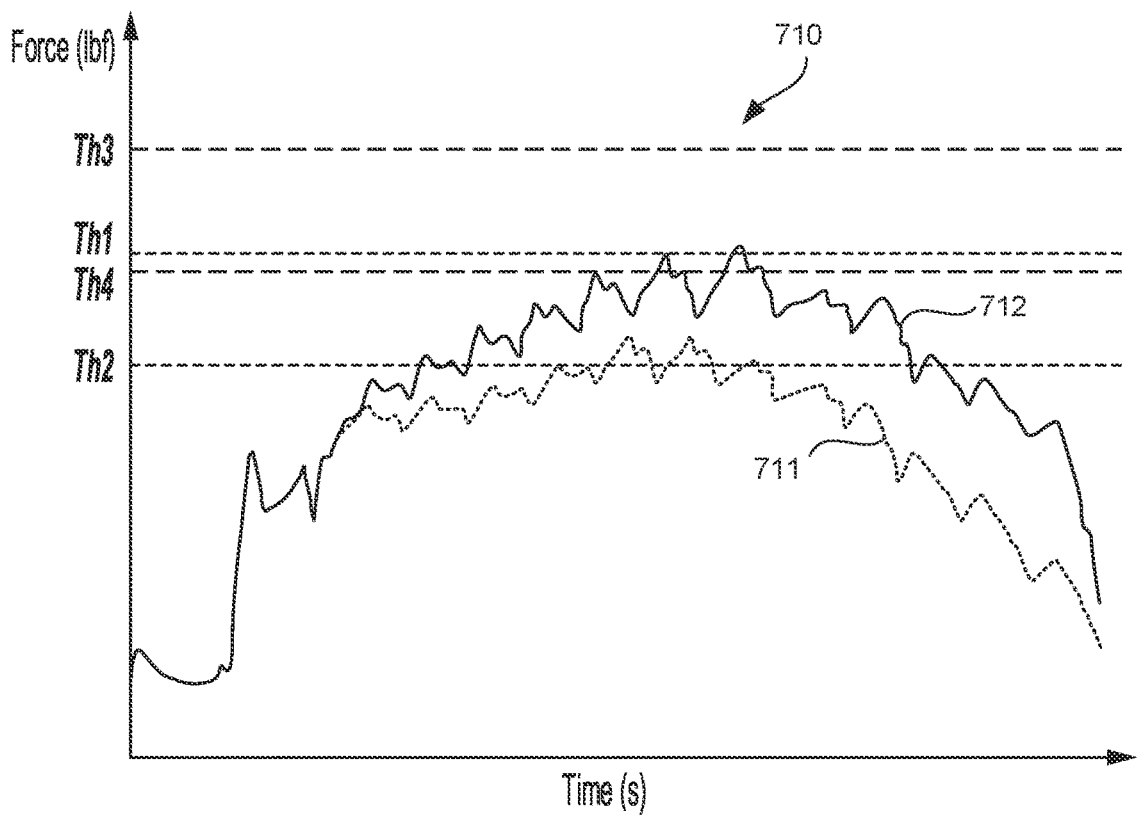

FIG. 5 is a graph illustrating an adaptive behavior of a surgical stapling system during a surgical procedure that involves a sequential firing of multiple staple cartridges, in accordance with the present disclosure.

Figure 6:
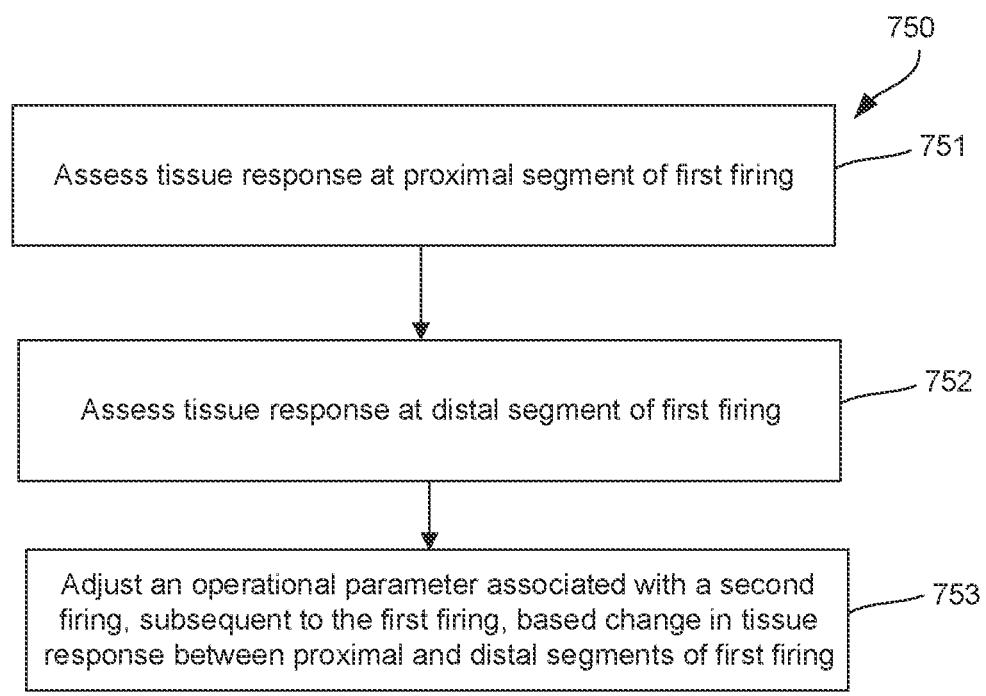

FIG. 6 is a flow diagram illustrating a logic configuration of a method for adjusting a second firing based on a change in the tissue response in predetermined segments of a first firing, in accordance with the present disclosure.

Figure 7:
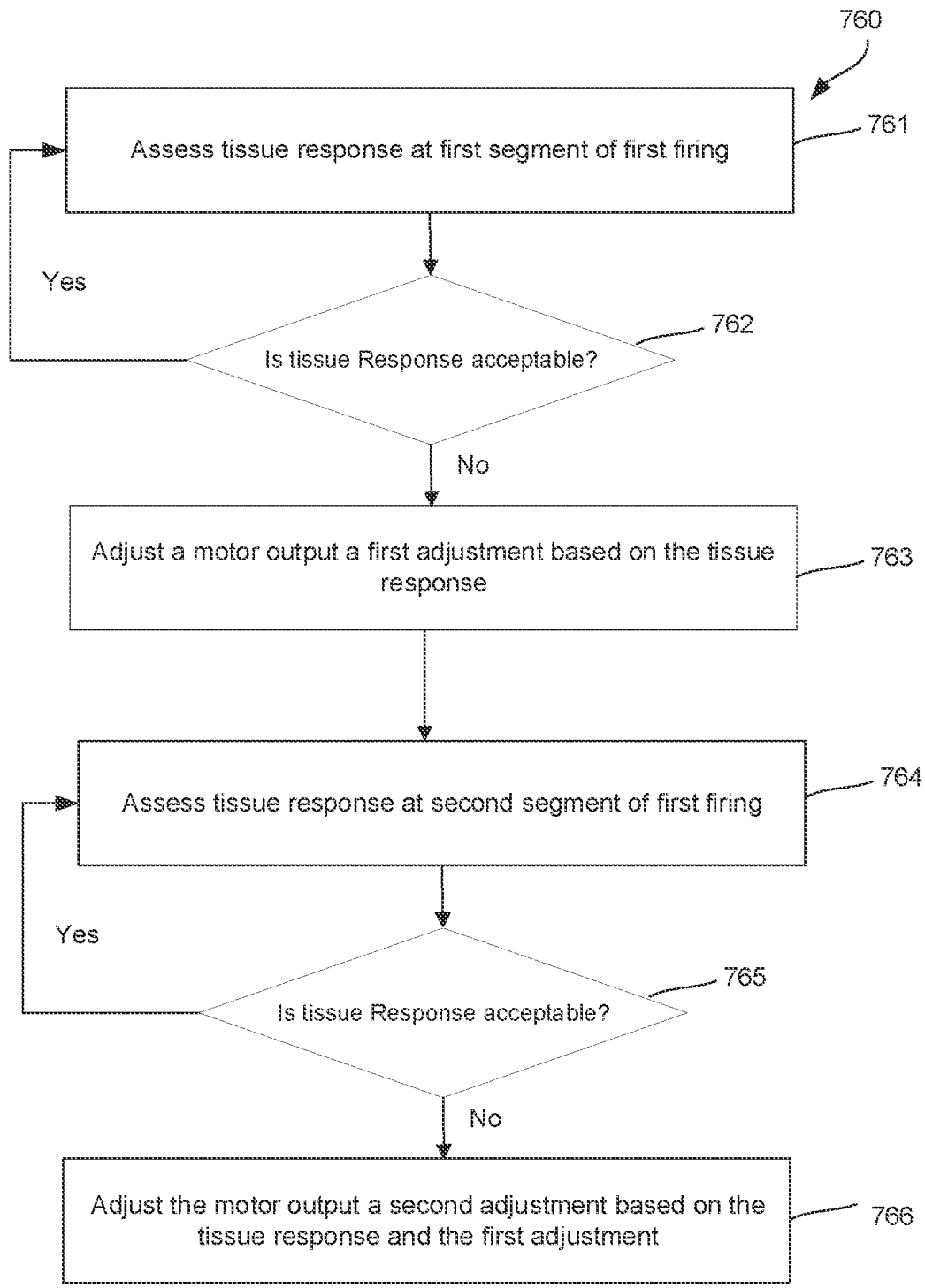

FIG. 7 illustrates a logic configuration of a method that utilizes learned triggers for motor control adaptation, learned triggers for motor control adaptation, in accordance with the present disclosure.

Figure 8:
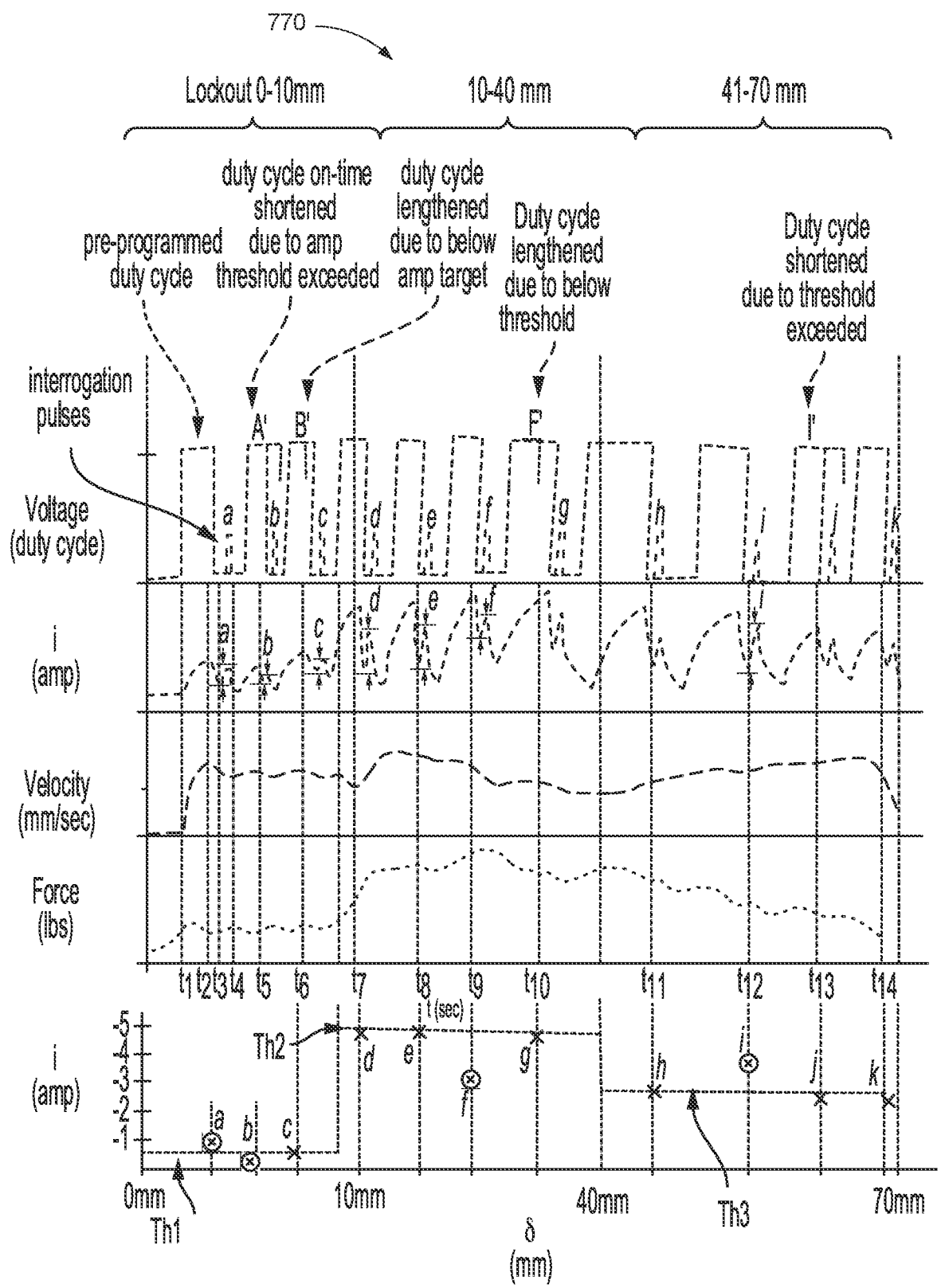

FIG. 8 is a graph illustrating various parameters associated with a staple cartridge firing by the surgical system, which are indicative of the tissue response, in accordance with the present disclosure.

DESCRIPTION

Applicant of the present application owns the following U.S. patent applications that were filed on Oct. 13, 2023 and which are each herein incorporated by reference in their respective entireties:

U.S. patent application Ser. No. 18/379,759, titled METHOD OF OPERATING A SURGICAL STAPLING INSTRUMENT; now U.S. Patent Application Publication No. 2025/0120695;

U.S. patent application Ser. No. 18/379,762, titled SURGICAL STAPLING SYSTEMS WITH ADAPTIVE STAPLE FIRING ALGORITHMS; now U.S. Patent Application Publication No. 2025/0120696;

U.S. patent application Ser. No. 18/379,766, titled CONTROL CIRCUIT FOR ACTUATING MOTORIZED FUNCTION OF SURGICAL STAPLING INSTRUMENT UTILIZING INERTIAL DRIVE TRAIN PROPERTIES; now U.S. Pat. No. 12,301,582;

U.S. patent application Ser. No. 18/379,768, titled PROPORTIONATE BALANCING OF THE FUNCTION IMPACT MAGNITUDE OF BATTERY OUTPUT TO PEAK MOTOR CURRENT; now U.S. Patent Application Publication No. 2025/0120692;

U.S. patent application Ser. No. 18/379,771, titled MOTOR OPTIMIZATION BY MINIMIZATION OF PARASITIC LOSSES AND TUNING MOTOR DRIVE CONFIGURATION; now U.S. Pat. No. 12,274,440;

U.S. patent application Ser. No. 18/379,773, titled APPARATUS AND METHOD TO REDUCE PARASITIC LOSSES OF THE ELECTRICAL SYSTEM OF A SURGICAL INSTRUMENT; now U.S. Patent Application Publication No. 2025/0120683;

U.S. patent application Ser. No. 18/379,776, titled SURGICAL TOOL WITH RELAXED FLEX CIRCUIT ARTICULATION; now U.S. Patent Application Publication No. 2025/0120732;

U.S. patent application Ser. No. 18/379,777, titled WIRING HARNESS FOR SMART STAPLER WITH MULTI AXIS ARTICULATION; now U.S. Patent Application Publication No. 2025/0120693;

U.S. patent application Ser. No. 18/379,781, titled SURGICAL SYSTEM WITH WIRELESS ARRAY FOR POWER AND DATA TRANSFER; now U.S. Pat. No. 12,329,379; and U.S. patent application Ser. No. 18/379,784, titled SURGICAL STAPLE CARTRIDGE COMPRISING REPLACEABLE ELECTRONICS PACKAGE; now U.S. Pat. No. 12,193,670.

Applicant of the present application owns the following U.S. patent applications that were filed on Oct. 13, 2023 and which are each herein incorporated by reference in their respective entireties:

U.S. patent application Ser. No. 18/379,790, titled METHOD OF ASSEMBLING A STAPLE CARTRIDGE; now U.S. Patent Application Publication No. 2025/0120700;

U.S. patent application Ser. No. 18/379,793, titled CONTROL SURFACES ON A STAPLE DRIVER OF A SURGICAL STAPLE CARTRIDGE; now U.S. Patent Application Publication No. 2025/0120712;

U.S. patent application Ser. No. 18/379,796, titled INTEGRAL CARTRIDGE STIFFENING FEATURES TO REDUCE CARTRIDGE DEFLECTION; now U.S. Pat. No. 12,357,302;

U.S. patent application Ser. No. 18/, titled STAPLE CARTRIDGE COMPRISING WALL STRUCTURES TO REDUCE CARTRIDGE DEFLECTION; now U.S. Patent Application Publication No. 2025/0120702;

U.S. patent application Ser. No. 18/379,803, titled PANLESS STAPLE CARTRIDGE ASSEMBLY COMPRISING RETENTION FEATURES FOR HOLDING STAPLE DRIVERS AND SLED; now U.S. Pat. No. 12,357,308;

U.S. patent application Ser. No. 18/379,805, titled STAPLE CARTRIDGE COMPRISING A SLED HAVING A DRIVER LIFT CAM; now U.S. Pat. No. 12,279,769;

U.S. patent application Ser. No. 18/379,808, titled SURGICAL STAPLE CARTRIDGES WITH SLEDS CONFIGURED TO BE COUPLED TO A FIRING DRIVER OF A COMPATIBLE SURGICAL STAPLER; now U.S. Patent Application Publication No. 2025/0120704;

U.S. patent application Ser. No. 18/379,810, titled STAPLE CARTRIDGE COMPRISING A COMPOSITE SLED; now U.S. Patent Application Publication No. 2025/0120705;

U.S. patent application Ser. No. 18/379,811, titled SURGICAL INSTRUMENTS WITH JAW AND FIRING ACTUATOR LOCKOUT ARRANGEMENTS LOCATED PROXIMAL TO A JAW PIVOT LOCATION; now U.S. Patent Application Publication No. 2025/0120706;

U.S. patent application Ser. No. 18/379,815, titled SURGICAL INSTRUMENTS WITH LATERALLY ENGAGEABLE LOCKING ARRANGEMENTS FOR LOCKING A FIRING ACTUATOR; now U.S. Patent Application Publication No. 2025/0120707;

U.S. patent application Ser. No. 18/379,817, titled DUAL INDEPENDENT KEYED LOCKING MEMBERS ACTING ON THE SAME DRIVE MEMBER; now U.S. Patent Application Publication No. 2025/0120714;

U.S. patent application Ser. No. 18/379,820, titled ADJUNCTS FOR USE WITH SURGICAL STAPLING INSTRUMENTS; now U.S. Pat. No. 12,295,578;

U.S. patent application Ser. No. 18/379,822, titled ADJUNCTS FOR USE WITH SURGICAL STAPLING INSTRUMENTS; now U.S. Patent Application Publication No. 2025/0120694;

U.S. patent application Ser. No. 18/379,826, titled JAW CONTROL SURFACES ON A SURGICAL INSTRUMENT JAW; now U.S. Application Publication No. 2025/0120733;

U.S. patent application Ser. No. 18/379,827, titled ZONED ALGORITHM ADAPTIVE CHANGES BASED ON CORRELATION OF COOPERATIVE COMPRESSION CONTRIBUTIONS OF TISSUE; now U.S. Pat. No. 12,295,576;

U.S. patent application Ser. No. 18/379,831, titled STAPLE CARTRIDGES COMPRISING TRACE RETENTION FEATURES; now U.S. Pat. No. 12,310,583; and U.S. patent application Ser. No. 18/379,832, titled STAPLE CARTRIDGES COMPRISING STAPLE RETENTION FEATURES; now U.S. Pat. No. 12,349,904.

Various methods, instruments, and systems are provided for performing surgical procedures. Various surgical systems disclosed herein include working portions that can be inserted into a body in any way, such as through a natural orifice, through an incision or puncture hole formed in tissue, etc. The working portions or end effector portions can be inserted directly into a patient's body or can be inserted through an access device that has a working channel. As the present Detailed Description proceeds, it will be understood that the various unique and novel arrangements of the various forms of surgical systems disclosed herein may be effectively employed in connection with robotically-controlled surgical systems and/or hand-held surgical systems. Various robotic systems, instruments, components and methods are disclosed in U.S. patent application Ser. No. 13/118,241, entitled SURGICAL STAPLING INSTRUMENTS WITH ROTATABLE STAPLE DEPLOYMENT ARRANGEMENTS, which is incorporated by reference herein in its entirety.

Referring to FIGS. 1-3, a surgical stapling system 5 includes a shaft 10 and an end effector 20 extending from the shaft 10. The end effector 20 includes a first jaw and a second jaw. The first jaw defines a channel 21 and a staple cartridge 22 removably positionable in the channel 21. However, other embodiments are envisioned in which a staple cartridge is not removable, or at least readily replaceable, from the first jaw. The second jaw includes an anvil 24 configured to deform staples 25 (See FIG. 2) ejected from the staple cartridge 22. The second jaw is pivotable relative to the first jaw about a closure axis to transition the end effector 20 between an open configuration and a closed configuration. Other embodiments are envisioned in which the first jaw is pivotable relative to the second jaw.

The surgical stapling system 5 further includes an articulation joint 30 configured to permit the end effector 20 to be rotated, or articulated, relative to the shaft 10. The end effector 20 is rotatable about an articulation axis extending through the articulation joint 30. Other embodiments are envisioned which do not include an articulation joint. In the illustrated example, cooperating articulation rods 31, 32 are configured to articulate the end effector 20 relative to the shaft 10 about an articulation joint 30. The surgical stapling system 5 further includes an articulation lock bar 33 the selectively prevents the articulation of the end effector 20.

The staple cartridge 22 includes a cartridge body 27 with a proximal end, a distal end, and a deck 26 extending between the proximal end and the distal end. In use, the staple cartridge 22 is positioned on a first side of the tissue to be stapled and the anvil 24 is positioned on a second side of the tissue. In accordance with the present disclosure, the anvil 24 can be moved toward the staple cartridge 22 to compress and clamp the tissue against the deck 26. The staple cartridge 22 can be moved relative to the anvil 24 or, alternatively, both the staple cartridge 22 and the anvil 24 can be moved to compress and clamp the tissue.

Further to the above, a drive shaft 40 is movable distally to motivate a firing beam 60 to transition the end effector 20 toward the closed configuration, thereby compressing the tissue. In the illustrated example, the firing beam 60 is in the form of an I-beam that includes a first cam and a second cam configured to engage the first and second jaws, respectively. As the firing beam 60 is advanced distally, the first cam and the second cam can control the distance, or tissue gap, between the deck of the staple cartridge 22 and the anvil 24. In the illustrated example, the firing beam 60 motivates a sled 50 to deploy the staples 25 from the staple cartridge 22. In accordance with the present disclosure, a separate closure mechanism, e.g. a closure tube, can be employed to transition the end effector 20 toward the closed configuration. The firing beam 60 may or may not include the first and second cams. Additionally, the firing beam 60 may be in the form of an E-beam with first, second, and third cams. The firing beam 60 and the closure tube can cooperatively effect closure of the end effector 20. Additionally, the firing beam 60 may only effect deployment of the staples 25.

In accordance with the present disclosure, as illustrated in FIG. 1, the firing beam 60 may include a knife configured to incise the tissue captured intermediate the staple cartridge 22 and the anvil 24. It is desirable for the knife to be positioned at least partially proximal to the ramped surfaces such that the staples are ejected ahead of the knife. More details about alternative embodiments of surgical stapling systems, suitable for use with the present disclosure, are disclosed in U.S. patent application Ser. No. 15/385,887 entitled METHOD FOR ATTACHING A SHAFT ASSEMBLY TO A SURGICAL INSTRUMENT AND, ALTERNATIVELY, TO A SURGICAL ROBOT, and U.S. patent application Ser. No. 16/209,416, entitled METHOD OF HUB COMMUNICATION, PROCESSING, DISPLAY, AND CLOUD ANALYTICS, which are hereby incorporated by reference herein in their entireties.

The staples 25 removably stored in the cartridge body 27 can be deployed into the tissue. The cartridge body 27 includes staple cavities 28 defined therein wherein staples 25 are removably stored in the staple cavities 28. The staple cavities 28 are arranged in longitudinal rows. In the illustrated example, three rows of staple cavities 28 are positioned on a first side of a longitudinal slot 29 and three rows of staple cavities 28 are positioned on a second side of the longitudinal slot. Other arrangements of staple cavities 28 and staples 25 are possible.

The staples 25 are supported by staple drivers 35 in the cartridge body 27. The staple drivers 35 are movable between a first, or unfired position, and a second, or fired, position to eject the staples 25 from the staple cavities 28. The staple drivers 35 are movable between their unfired positions and their fired positions by a sled 50 that includes ramped surfaces 51 configured to slide under the staple drivers 35 and lift the staple drivers 35, and the staples 25 supported thereon, toward the anvil 24. In the illustrated example, the distal movement of the drive shaft 40 causes the sled 50 to move distally within the staple cartridge 22 to deploy the staples 25.

Referring primarily to FIG. 2, the sled 50 includes a first ramped surface 51a, a second ramped surface 51b, a third ramped surface 51c, and a fourth ramped surface 51d configured to engage a first staple drive 35a, a second staple driver 35b, a third staple driver 35c, and a fourth staple driver 35d, respectively, along a staple-forming distance (D) to deploy staples 25 from corresponding staple cavities 28a, 28b, 28c, 28d for forming against corresponding forming pockets in the anvil 24. In the illustrated example, the staple drivers 35b, 35c are double drivers, while the staple drivers 35a, 35d are single drivers. Double drivers support two staples in two separate staple cavities, while single drivers support a single staple in a single staple cavity.

FIG. 2 illustrates one exemplification of a staple-forming distance (D). In accordance with the present disclosure, the staple-forming distance (D) can be characterized as a distance spanning a number of the staple cavities 28 housing staple drivers 35 that are simultaneously engaged by the sled 50. Additionally, the staple-forming distance (D) can be characterized as a distance travelled by the sled 50 while simultaneously engaging a group of staple drivers 35 to transition the staple drivers 35 between their unfired positions and their fired positions, thereby causing the staples 25 positioned on the staple drivers 35 to be formed against the anvil 24.

The sled 50 and the staple drivers 35a-d are configured to stagger staple formation of staples 25 in staple cavities 28a-d. The ramped surfaces 51 are shaped and arranged to facilitate an offset firing of the staples 25 in the staple cavities 28a-d to reduce the forces experienced by the sled 50 as the sled 50 is moved along the staple-forming distance (D). In other words, the ramped surfaces 51 can be tailored to stagger staple-formation progress in a manner that maintains the firing forces experienced by the sled 50 at, or below, a predetermined threshold ($F_T$).

In the illustrated example, the ramped surfaces 51a, 51d are identical, or at least substantially the same, which causes the single staple drivers 35a, 35b to be simultaneously lifted by the sled 50 at the same pace. The ramped surfaces 51b, 51c are different from each other, and different from the ramped surfaces 51a, 51b, which causes the double staple drivers to be lifted by the sled 50 at a different pace from each other, and at a different pace from the staple drivers 35a, 35d. In other words, the peak forces associated with the double drivers 35b, 35c are out of phase with each other, and are also out of phase with peak forces associated with the single drivers 35a, 35d.

The ramped surfaces 51 cause a peak force associated with simultaneously forming the staples supported by the single staple drivers 35a, 35d to occur, at Q, ahead of a peak force associated with forming staples supported by the staple drivers 35b (at R), 35c (at S). Q, R, S represent positions on the ramped surfaces 51 of the sled 50 corresponding to the staggered peak forces associated with staple drivers 35a, 35d, staple driver 35b, and staple driver 35c, respectively, as illustrated in FIG. 2. Staggering the staple-formation progress of staples in staple cavities 28a-d positioned along the staple forming distance (D) reduces the forces experienced by the sled 50 as the sled 50 simultaneously lifts the staple drivers 35a-d through various stages of staple formation including, for example, a staple buckling stage and/or a staple final-crunching stage. Peak forces associated with other groups of staple drivers 35 can be similarly staggered.

Other factors can also influence staple-formation progress and peak forces such as, for example, geometries of cam surfaces of the staple drivers, and contact locations between the ramped surfaces 51 and the staple drivers 35. In the illustrated example, contact locations 52, 53 define locations on the cam surfaces of the staple drivers 35a-d where the ramped surfaces 51 of the sled 50 first engage and lift the staple drivers 35a-d to deploy the staples 25. The staggered staple-formation progress is aided by geometries of cam surfaces of the staple drivers 35a-d and/or contact locations 52, 53 between the cam surfaces of the staple drivers 35a-d and corresponding ramped surfaces 51a-d.

In the illustrated example, the contact location 52 of the staple driver 35a is a distance (d) from a proximal staple leg 26a of a staple 25a supported by the staple driver 35a. The contact location 52 is closer to the proximal staple leg 26a than a distal staple leg 27a of the staple 25a. Furthermore, the contact location 53 of the staple driver 35b is a distance (e) from a proximal leg 26b of a distal staple 25b supported by the staple driver 35b, and a distance (f) from a distal staple leg 27c of a proximal staple 25c supported by the staple driver 35b. The distances d, e, f are different from one another, and are tailored to support the staggered staple-formation progress along the staple-forming distance (D). In the illustrated example, the distance (f) is greater than the distance (d), and the distance (d) is greater than the distance (e). Similar contact locations and/or contact surfaces geometries are implemented in the staple drivers 35c, 35d, and other staple drivers 35 along the firing stroke.

FIG. 3 is a block diagram illustrating one exemplification of the surgical stapling system 5. Various components of the surgical stapling system 5 communicate with a control circuit 100. Such components may receive signals from and/or transmit signals to the control circuit 100. Such signals include command signals, status signals, sensor signals, and/or any other suitable signals. The control circuit 100 can be configured to implement various methods described herein with the aid of various components of the surgical stapling system in communication with the control circuit 100. In the illustrated example, the control circuit 100 includes a controller 102 comprising one or more processors 104 (e.g., microprocessor, microcontroller) coupled to at least one memory circuit 106. The memory circuit 106 stores machine executable instructions that when executed by the processor 104, cause the processor 104 to execute machine instructions to implement various processes described herein. The processor 104 may be any one of a number of single or multi-core processors known in the art. The memory circuit 106 may comprise volatile and non-volatile storage media. The processor 104 may include an instruction processing unit and an arithmetic unit. The instruction processing unit may be configured to receive instructions from the memory circuit 106. In accordance with the present disclosure, the control circuit 100 may include a combinational logic circuit and/or a sequential logic circuit. The processor 104 is in communication with a database 124 to store various information associated with the surgical stapling system 5. The database 124 can store an identifier of a staple cartridge, or other component of the end effector 20.

In accordance with the present disclosure, the control circuit 100 may be configured to communicate with a motor assembly 110 that includes a motor and a motor controller, for example. The motor assembly may generate rotational motion to effect a translating motion of the drive shaft 40. The control circuit 160 may generate a motor set point signal. The motor set point signal may be provided to a motor controller. The motor controller may comprise one or more circuits configured to provide a motor drive signal to a motor to drive the motor as described herein. The motor may be a brushed DC electric motor. For example, the velocity of the motor may be proportional to the motor drive signal. Alternatively, or additionally, the motor may be a brushless DC electric motor and the motor drive signal may comprise a PWM signal provided to one or more stator windings of the motor. In accordance with the present disclosure, the motor controller may be omitted, and the control circuit 100 may generate the motor drive signal directly. The position, movement, displacement, and/or translation of the drive shaft 40, the firing beam 60 and/or the sled 50 (collectively referred to herein as the "firing assembly") can be measured/monitored by the control circuit 100 based on input from one or more sensors 120.

The motor assembly 110 may be powered by a power source 111 that in one form may comprise a removable power pack. The power pack may include a housing configured to support a plurality of batteries that may each include, for example, a Lithium Ion ("LI") or other suitable battery, and may be connected in series, for example. The power source 111 may be replaceable and/or rechargeable. Other power sources are contemplated by the present disclosure.

The sensors 120 may include a position sensor 121 configured to sense a position, movement, displacement, and/or translation of one or more components of the firing assembly such as, for example, the drive shaft 40, the firing beam 60 and/or the sled 50. The sensor 121 may include any type of sensor that is capable of generating position data that indicate a position of the firing assembly. In accordance with the present disclosure, the sensor 121 may include an encoder configured to provide a series of pulses to the control circuit 100 as the firing assembly translates distally and proximally. The control circuit 100 may track the pulses to determine the position, movement, displacement, and/or translation of the components of the firing assembly. Other suitable position sensors may be used, including, for example, a proximity sensor. Other types of position sensors may provide other signals indicating motion of the firing assembly. Where the motor is a stepper motor, the control circuit 100 may track the position of components of the firing assembly by aggregating the number and direction of steps that the motor has been instructed to execute. The sensors 120 may be located in the end effector 20 or at any other portion of the surgical stapling system 5.

Various sensors 120 may be adapted to measure various other parameters such as gap distance versus time, tissue compression versus time, and anvil strain versus time. The sensors 120 may comprise a magnetic sensor, a magnetic field sensor, a strain gauge, a pressure sensor, a force sensor, an inductive sensor such as an eddy current sensor, a resistive sensor, a capacitive sensor, an optical sensor, and/or any other suitable sensor for measuring one or more parameters of the end effector 20. The one or more than one sensor 120 may be sampled in real time during a clamping operation by the processor 104 of the control circuit 100. The control circuit 100 receives real-time sample measurements to provide and analyze time-based information and assess, in real time, a measured parameter such as, for example, force and/or position parameters.

The one or more than one sensor 120 may comprise a strain gauge, such as a micro-strain gauge, configured to measure the magnitude of the strain in the anvil 24 during a clamped condition. The strain gauge provides an electrical signal whose amplitude varies with the magnitude of the strain. The sensors 120 may comprise a pressure sensor configured to detect a pressure generated by the presence of compressed tissue between the anvil 24 and the staple cartridge 22. The sensors 120 may be configured to detect impedance of a tissue section located between the anvil 24 and the staple cartridge 22 that is indicative of the thickness and/or fullness of tissue located therebetween.

The sensors 120 may include a force sensor 122 configured to measure forces associated with firing and/or closure conditions. For example, sensor 122 can be at an interaction point between a closure tube and the anvil 24 to detect the closure forces applied by a closure tube to the anvil 24. The forces exerted on the anvil 24 can be representative of the tissue compression experienced by the tissue section captured between the anvil 24 and the staple cartridge 22. The sensor 122 can be positioned at various interaction points along the closure drive system to detect the closure forces applied to the anvil 24.

Similarly, a force sensor 122 can be at an interaction point between components of the firing assembly to detect the firing forces applied by the firing assembly to advance the firing beam 60 and the sled 50 to deploy the staples into tissue and cut the tissue. The measured forces represent a firing load experienced by the firing assembly. Alternatively, or additionally, a current sensor can be employed to measure the current drawn by the motor of the motor assembly 110. The force required to advance the firing assembly corresponds to the current drawn by the motor. The measured force can be converted to a digital signal and provided to the control circuit 100.

Further to the above, the surgical stapling system 5 includes a user interface 140 having an input device (e.g., a capacitive touchscreen or a keyboard) for receiving inputs from a user and an output device (e.g., a display screen) for providing outputs to a user. Outputs can include data from a query input by the user, suggestions for products or mixes of products to use in a given procedure, and/or instructions for actions to be carried out before, during, or after surgical procedures. The user interface 140 can be in communication with the control circuit 100, as illustrated in FIG. 3.

During a surgical stapling procedure, a clinician may operate a surgical stapling system 5 to sequentially fire multiple staple cartridges along a selected tissue resection line to achieve a clinical outcome. For example, in a stomach resection procedure, the clinician may sequentially fire staple cartridges of different characteristics (e.g., size, color, type, length, staple height, staple diameter, staple size) along a selected tissue resection line to remove a portion of the stomach. The staple cartridges can be fired along the tissue resection line in an end-to-end arrangement.

The clinician may examine the tissue to be resected using any suitable imaging technique such as, for example, x-ray, registered magnetic resonance imaging (MRI), and/or computerized tomography (CT) scan. The clinician may then select a suitable tissue resection line, and staple cartridges for sequential firing along the selected tissue resection line. Visual examination, however, has its limitations, and a tissue response to stapling can vary depending on many factors including, for example, patient age, tissue health, and/or tissue type. Moreover, tissue thickness and/or stiffness may vary along the selected tissue resection line, resulting in unexpected tissue responses.

Various methods, devices, and systems are provided for adaptively adjusting operational parameters of the surgical stapling system 5 during a staple cartridge firing based on a tissue response in an earlier phase/zone of the staple cartridge firing. Moreover, various methods, devices, and systems are provided for adaptively adjusting operational parameters of the surgical stapling system 5 during a staple cartridge firing based on a tissue response in one or more previous staple cartridge firings in a surgical procedure involving multiple sequential firings.

In accordance with the present disclosure, the processor 104 may execute various program instructions, which can be stored in a memory circuit such as the memory circuit 106, to implement various algorithms associated with firing a staple cartridge by the surgical stapling system 5. Various aspects of such algorithms, e.g., thresholds, limits, triggers, conditions, pauses, wait time, are adjusted based on information learned from a tissue response in an earlier phase/zone of the staple cartridge firing, and/or based on a tissue response in one or more previous staple cartridge firings in a surgical procedure involving multiple sequential firings, as described in more detail below.

FIG. 4 is flow diagram illustrating a logic configuration of a method 709 for adjusting operational parameters of the surgical stapling system 5 in a surgical procedure that involves a first firing that deploys first staples from a first staple cartridge (e.g. staple cartridge 22) into a first tissue portion, and a second firing that deploys second staples from a second staple cartridge into a second tissue portion adjacent the first tissue portion. The first tissue portion and the second tissue portion reside along a planned tissue resection line, and the first staples and the second staples are deployed in an end-to-end arrangement along the tissue resection line.

One or more firings of staple cartridges can precede the first firing of the first staple cartridge along the tissue resection line. Additionally, the first staple cartridge can be the same as, or different than, the second staple cartridge in color, size, shape, staple height, staple diameter, and/or any other suitable feature.

With reference now to FIG. 4 together with FIG. 3, in accordance with the method 709, the control circuit 100 monitors 706 a parameter indicative of a tissue response associated with the first firing. The control circuit 100 assesses 707 the tissue response based on the monitored 706 parameter, and adjusts 703 an operational parameter associated with the second firing based on the tissue response during the first firing.

In accordance with the present disclosure, the monitored 706 parameter can be a tissue resistance to the advancement of the firing assembly during the first firing. The control circuit 100 can monitor 706 the tissue resistance using one or more of the sensors 120. Additionally, one or more force sensors 122 can measure the force exerted against the drive shaft 40, the sled 50, and/or the firing beam 60, which represents the tissue response during the first firing.

Alternatively, or additionally, a current sensor can be employed together with the control circuit 100 to assess the tissue response during the first firing. In accordance with the present disclosure, the control circuit 100 can be coupled to a current sensor to receive a signal indicative of the current supplied by the power source 111 to the motor of motor assembly 110 during the first firing. A change in the current draw of the motor is representative of a change in the tissue resistance to the advancement of the firing assembly, which is representative of the tissue response during the first firing.

Alternatively, or additionally, the tissue response can be assessed based on a secondary input such as a temperature sensor that measures a temperature of the motor, for example. If the temperature of the motor is higher than a predetermined threshold, the increase in the temperature of the motor is indicative of an overload, or stall, condition.

Further to the above, according to the method 709, the control circuit 100 assesses 707 the tissue response based on the monitored 706 parameter. In accordance with the present disclosure, the control circuit 100 may assess 707 the tissue response by comparing measured values of the monitored 706 parameter to a predetermined threshold. The processor 104 may determine the values based on input from the sensors 120, retrieve the predetermined threshold, and compare the values to the retrieved predetermined threshold. The values can be determined by the control circuit 100 by sampling sensor readings of the parameter.

In accordance with the present disclosure, the predetermined threshold of the parameter can be selected by the processor 104 based on the cartridge type of the first staple cartridge. Different predetermined thresholds can be preset for different staple cartridge types. The control circuit 100 can retrieve an identifier of the first staple cartridge, and query a database stored in the memory 106, for example, for the predetermined threshold based on the retrieved identifier. The database may include a list of identifiers and corresponding predetermined thresholds. Also, in accordance with the present disclosure, the control circuit 100 may communicate wirelessly, or through a wired connection, with a cartridge chip, or memory unit, within the first staple cartridge to retrieve the identifier associated with the first staple cartridge. The identifier may be provided by a clinician through the user interface 140.

Further to the above, the control circuit 100 may store an outcome of the comparison, indicative of the tissue response, for use in the second firing. A tissue response that violates one or more predetermined thresholds of the first staple cartridge can inform the selection of the second staple cartridge. Accordingly, adjusting 703 the operational parameter associated with the second firing may include the control circuit 100 selecting, or at least recommending, a second staple cartridge with different predetermined thresholds than the first staple cartridge, where the tissue response during the first firing indicates a violation of the one or more predetermined of the first staple cartridge.

After completion of the first firing, the control circuit 100 may select, or at least recommend, a staple cartridge type for the second firing based on the stored outcome of the comparison. In accordance with the present disclosure, the control circuit 100 can detect an identifier of the second staple cartridge in a similar manner to that described in connection with the first staple cartridge, and prompt the clinician, for example through the user interface 140, to change to a different staple cartridge type based on the outcome of the comparison during the first firing.

In accordance with the present disclosure, the surgical system 5 can be used in a sleeve gastrectomy, for example, involving multiple sequential firings along a planned tissue resection line. After the first firing on the sleeve using a clinician chosen staple cartridge, the control circuit 100 may determine, based on the tissue response during the first firing, that the tissue thickness is greater than that recommended for the staple cartridge utilized in the first firing. The control circuit 100 may then prompt the clinician through the user interface 140 as to the higher than expected tissue thickness and asks if the clinician wishes to adjust the current thresholds, for example, to accommodate increase during a second firing, change to a cartridge that is more appropriate to the tissue thickness, or to adapt the speed and pauses within the surgical system 5 to compensate for the differences. The control circuit 100 can provide the clinician an interrelationship between firing speeds, pauses, and loads associated with a selected, or recommended, staple cartridge, allowing the clinician to adjust the balance of the such interactive thresholds.

FIG. 5 is a graph 710 illustrating an example of the adaptive behavior of the surgical system 5 during a surgical procedure that involves a sequential firing of multiple staple cartridges. The adaptive behavior comprises a selection, or at least a recommendation, of a second staple cartridge based on a tissue response associated with a first staple cartridge in a sequential firing of the first and second staple cartridges. The X-axis represents firing time, and the Y-axis represents firing force. In the illustrated example, the tissue response is assessed by monitoring the firing force.

Graph 710 illustrates upper (Th1) and lower (Th2) predetermined thresholds associated with the first staple cartridge, and upper (Th3) and lower (Th4) predetermined thresholds associated with the second staple cartridge. Curve line 711 illustrates a tissue response in accordance with the upper (Th1) and lower (Th2) predetermined thresholds associated with a first staple cartridge. Since a suitable tissue response is detected, the control circuit 100 selects, or at least recommends, the first staple cartridge type for the subsequent firing.

In contrast, curve line 712 illustrates a tissue response that violates the upper (Th1) predetermined threshold associated with the first staple cartridge during the first firing. In response, the control circuit 100 selects, or at least recommends, a different staple cartridge type for the second firing, with higher upper (Th3) and lower (Th4) predetermined thresholds. Alternatively, if a clinician elects to use the first staple cartridge type in the second firing, the control circuit 100 overrides the upper (Th1) predetermined threshold, and adjusts 703 other operational parameters of the surgical system 5 such as, for example, motor output, clamp time, and/or firing pauses during the second firing to maintain and/or return the second firing to a level below the upper (Th1) predetermined threshold.

In accordance with the present disclosure, the surgical stapling system 5 may execute the method 709 in a gastric bypass surgery that involves multiple firings along a planned transection line across the stomach. Some clinicians tend to use different staple cartridge types, e.g. different sizes such as a thick reload followed by a thin reload, along the tissue resection line. Others tend to use the same staple cartridge type, e.g. a specific size such as a thick reload or a thin reload, along the tissue resection line. For the latter, the control circuit 100 may execute the method 709 by adjusting 703 a tissue compression parameter and/or a firing parameter based on the tissue response to the thick reload or the thin reload. For example, if the tissue response in a previous firing indicates that the utilized staple cartridge size is too thick for the tissue, the control circuit 100 increases tissue compression time and/or decreases firing speed. In contrast, if the tissue response in a previous firing indicates that the utilized staple cartridge size is too thin for the tissue, the control circuit 100 may decrease tissue compression time and/or increases firing speed.

FIG. 6 is a flow diagram illustrating a logic configuration of a method 750 for adjusting a second firing based on a change in the tissue response in predetermined segments of the first firing, wherein the change in the tissue response indicates a change in a tissue characteristic between the predetermined segments. The method 750 is similar in many respects to the method 709. For example, the method 750 also can be executed by the control circuit 100 in a surgical procedure involving multiple sequential firings including a firing of a first staple cartridge and a subsequent firing of a second staple cartridge along a planned tissue transection line.

In accordance with the present disclosure, the control circuit 100 may monitor the same parameter, or parameters, during the method 709 and the method 750. The control circuit 100 may monitor a first parameter during the method 709, and a second parameter, different than the first parameter, in the method 750. The methods 709, 750 can be executed separately or in combination.

As described above, the tissue response depends, at least in part, on characteristics of the tissue such as, for example, tissue thickness and/or stiffness, which can gradually change along a tissue resection line. Accordingly, a change in the tissue response between a proximal segment and a distal segment of a firing along a tissue resection line can be predictive of the tissue response, and characteristics, in a subsequent firing along the tissue resection line.

In the illustrated example, according to the method 750, the control circuit 100 assesses 751 the tissue response at a proximal segment of the first firing, assesses 752 the tissue response at a distal segment of the first firing, and adjusts 753 the operational parameter associated with the second firing based on a change in the tissue response between the proximal and distal segments of the first firing.

In accordance with the present disclosure, the change in the tissue response can be assessed based on values of the parameter detected at the different segments of the first firing. A first value of the parameter, which can be determined at the proximal segment, may be compared to a first predetermined threshold to determine a first delta between the first value and the first predetermined threshold. Similarly, a second value of the parameter, which can be determined at the distal segment, may be compared to a second predetermined threshold to determine a second delta between the second value and the second predetermined threshold. In accordance with the present disclosure, the change in the tissue response can be determined based on the first delta and the second delta. The change in the tissue response can be determined based on a mathematical relation between the first delta and the second delta such as, for example, a ratio of the first delta to the second delta.

Further to the above, the first and second predetermined thresholds can be selected based on the firing positions of one or more components of the firing assembly, during the advancement of the firing assembly along the firing stroke, where the first value and the second value, respectively, are measured. A database (e.g., database 124 FIG. 3), or a table, can store various predetermined thresholds, which represent acceptable, or ideal, upper or lower limits of the parameter at specific firing positions, and corresponding values that represent such firing positions. Alternatively, an equation for calculating the predetermined thresholds at the specific firing positions can be employed. The firing positions can define a variable in the equation.

In either event, the processor 104 employs the database, table, and/or equation to determine the first and second predetermined thresholds of the parameter based on the firing positions. One or more position sensors 121 can provide signals to the processor 104, which may be utilized by the processor 104 to determine the firing positions. In accordance with the present disclosure, the firing positions can be represented as distances from a starting position of the firing assembly. Alternatively, or additionally, the firing positions can be represented as ranges indicative of discrete portions of the firing such as, for example, a proximal portion, an intermediate portion, and/or a distal portion.

In accordance with the present disclosure, the first tissue response at the proximal segment and the second tissue response at the distal segment may indicate a change in tissue stiffness between the proximal segment and the distal segment of the first firing. Said another way, the change in the tissue response between the proximal segment and the distal segment may indicate a change in the tissue stiffness in a proximal-to-distal direction. The control circuit 100 can then adjust 753 one or more operational parameters of the surgical system 5 to address a predicted tissue stiffness in the second firing learned from the change in the tissue response between the proximal segment and the distal segment of the first firing.

If the predicted tissue stiffness is higher than expected, the control circuit 100 can adjust a firing algorithm of the second firing to reduce the firing speed, for example by introducing and/or adjusting one or more pauses during the second firing. Additionally, or alternatively, the control circuit 100 may select, or at least recommend, a different staple cartridge, one more suited for the predicted tissue stiffness. Additionally, or alternatively, the control circuit 100 may adjust or remove one or more predetermined thresholds, and/or changes a clamp, or tissue compression, time associated with to the second firing.

Conversely, if the predicted tissue stiffness is lower than expected, i.e., tissue becomes softer, the control circuit 100 can adjust a firing algorithm of the second firing to increase the firing speed, and/or remove and/or adjust one or more planned pauses during the second firing. Additionally, or alternatively, the control circuit 100 may select, or at least recommend, a different staple cartridge, one more suited for the predicted tissue stiffness. Additionally, or alternatively, the control circuit 100 may adjust or remove one or more predetermined thresholds, and/or changes a clamp, or tissue compression, time associated with the second firing.

FIG. 7 illustrates a logic configuration of a method 760 similar in many respects to the methods 709, 750. The method 760 can be executed by the control circuit 100 separately, or in combination with the method 709 and/or the method 750. In accordance with the present disclosure, the method 760 may focus on learned triggers for motor control adaptation. With reference to FIG. 7 together with FIG. 3, in the illustrated example, in accordance with the method 760, the control circuit 100 adjusts a firing algorithm based on monitored parameters (e.g., motor current), where the firing algorithm adjustments vary form a first intervention to a second intervention, as a learned response. In accordance with the present disclosure, the variation between the first and second interventions can be based on a failure achieving an expected tissue response such as, for example, a failure to lower a firing force resulting from tissue resistance, as expected after the first intervention.

Like the method 750, the method 760 includes assessing the tissue response at multiple segments of the first firing. In the illustrated example, in accordance with the method 760, the control circuit 100 assesses 761 a first tissue response at a first segment of the first firing and assesses 762 a second tissue response at a segment of the first firing. The details of assessing a tissue response during a firing are similar to those described in connection with the methods 709, 750, and are not repeated herein for brevity.

According to the method 760, the control circuit 100 adjusts 763 a firing algorithm a first adjustment based on the first tissue response, which constitutes a first intervention. According to the method 760, the control circuit 100 determines 762 whether the first tissue response at a first segment of the firing is not acceptable, e.g., the value of the monitored parameter indicative of the tissue response is lower or higher than a predetermined threshold, the control circuit 100 adjusts 763 a firing algorithm a first adjustment based on the first value or based on the delta between the first value and the predetermined threshold. In accordance with the present disclosure, adjusting 763 the firing algorithm may include changing a motor output by, for example, changing a motor voltage parameter such as, for example, pulse-width-modulation (PWM) and/or amplitude.

Following the first adjustment 763, the control circuit 100 continues to assess 764 the tissue response at a second segment of the first firing, distal to the first segment, to determine the efficacy of the first intervention. According to the method 760, the control circuit 100 determines 765 whether a tissue response at the second segment of the firing is also not acceptable, e.g., the value of the monitored parameter indicative of the tissue response is lower or higher than a predetermined threshold, the control circuit 100 further adjusts 766 the firing algorithm a second adjustment, in a learned response, based on the assessed 764 tissue response, and the first adjustment. The second adjustment can, for example, a second adjustment to the motor output by, for example, changing a motor voltage parameter such as, for example, pulse-width-modulation (PWM) and/or amplitude.

Accordingly, the method 750 takes an adaptive approach in selecting the second adjustment, by taking into consideration the first adjustment. Said another way, the second adjustment is based on the tissue response to the first adjustment. For example, if the first adjustment was not effective in addressing the trigger of the first threshold, as can be determined based on the second value, the second delta, or measurements of other parameters relevant to the first firing, the control circuit 100 responds by selecting a more suitable second adjustment. In accordance with the present disclosure, a table, database, and/or equation can be employed to select the second adjustment based on the second value, or the second delta, and the first adjustments.

Further to the above, the learned or adaptive behavior of the control circuit 100 can be implemented automatically or can be conditioned upon a clinician approval receivable through the user interface 140. In accordance with the present disclosure, the control circuit 100 may calculate the second adjustment based on the tissue response and the first adjustment, and prompt the clinician for an approval to implement the second adjustment. If the approval is entered through the user interface 140, the control circuit 100 may then execute the second adjustment. The clinician may be further permitted to modify the second adjustment.

In accordance with the present disclosure, firing algorithm adjustments, in accordance with one more methods (e.g., methods 709, 750, 760) of the present disclosure, can include adjustments to predetermined thresholds. The learned behavior in a first firing can lead to one or more adjustments to one or more predetermined thresholds in a later segment of the first firing, and/or in a second firing that follows the first firing. Such thresholds include global thresholds including, for example, a global force-to-fire threshold that, if reached, the control circuit 100 deactivates the surgical system to avoid potential damage to the surgical system 5.

Such thresholds also include a device-specific force-to-fire threshold that is based on a particular surgical system 5. During final testing of the surgical system 5, where internal loads and frictions are documented, force-to-fire threshold is calculated as a combination of the actual force-to-fire threshold with shaft loads added. Such thresholds also include a cartridge-specific force-to-fire threshold, which are based on various staple cartridge characteristics such as, for example, cartridge size.

Referring still to FIG. 7, a decision to implement a firing algorithm adjustment, such as a predetermined threshold adjustment, in accordance with the method 760, is further based on the location along the firing stroke, where the predetermined threshold is implemented, and the location where the tissue response is assessed. The location can be a specific position, or segment, along the firing stroke, for example. As described above in greater detail, one or more position sensors 121 provide signals to the processor 104, which are utilized by the processor 104 to determine the firing positions. In accordance with the present disclosure, the firing positions can be represented as distances from a starting position of the firing assembly. Alternatively, or additionally, the firing positions can be represented as ranges indicative of discrete segments of the firing such as, for example, a proximal segment, an intermediate segment, and/or a distal segment.

FIG. 8 is a graph 770 illustrating various parameters associated with a staple cartridge firing by the surgical system 5, which are indicative of the tissue response, in accordance with at least one aspect of the present disclosure. The parameters are tracked along various segments of the firing stroke, and include motor voltage, motor current, firing velocity, and force exerted against the firing assembly during firing. The graph 770 further depicts examples of intra-firing adaptive behavior of the surgical system 5, which are based on interrogation pulses that are utilized to assess a tissue response during the firing.

In the illustrated example, the control circuit 100 introduces additional variations, in the form of interrogation pulses (a-k), to improve the adaptive behavior of the surgical system 5. During firing, the motor voltage is typically held constant while being pulse-width modulated for the purpose of delivering power to the motor of the motor assembly 110. The control circuit 100 introduces additional small variations into the motor voltage (dithering) to better understand the response of the measured aspects (motor current/speed/knife location), and the impact on the surgical system 5.

In accordance with the present disclosure, the control circuit 100 may introduce small spikes, e.g., interrogation pulses (a-k, at the end of each PWM cycle (e.g., at t1-t2), which are too small to have a clinical impact on RMS current, but rather create small peak responses in current (e.g., at t3). As illustrated in FIG. 8, the current peak responses are compared to predetermined threshold (e.g., Th1, Th2, Th3) for assessing the tissue response. If the current peak response is below the predetermined threshold, no changes or action may be required. Alternatively, or additionally, the control circuit 100 may increase the next duty cycle time (e.g., B', F') to increase firing speed based on the current peak response being below the predetermined threshold.

In contrast, if the current peak response is equal to, or higher than, the predetermined threshold, the control circuit 100 may adjust an operational parameter of the surgical system 5 such as, for example, the next PWM cycle pulse to be shorter in time (e.g., A', l'). Such adjustment decreases current draw by the motor assembly 110, thereby reducing velocity and/or force applied to the firing assembly, which effectively returns the tissue response to an acceptable value.

In accordance with the present disclosure, the control circuit 100 may begin the firing at 50% duty cycle on the motor assembly 110 to ensure the mechanical integrity of the components of the firing assembly, and/or to test a mechanical cartridge lockout, for example. During this initial segment, the force-to-fire can be monitored, and an initial peak level of the force-to-fire can be determined based on inputs from the force sensor 122, for example, to the control circuit 100. This initial peak can be used to set initial thresholds for the other segments of the firing stroke, in accordance with the method 760, for example.

In accordance with the present disclosure, if the control circuit 100 detects a thick, or dense, tissue based on the initial peak is designated "high," based on a comparison to an initial predetermined threshold, for example, this can be an indication that the tissue is thick or dense. In response, the control circuit 100 may increase predetermined thresholds for a second segment of the firing stroke. If, however, the initial force reading is low, the control circuit 100 may reduce predetermined thresholds for the second segment of the firing stroke. The increase or decrease can be based on the initial peak, or the delta between the initial peak and the initial predetermined threshold.

As the firing stroke transitions to a third segment, e.g. midpoint to end of cutline, the predetermined thresholds of the third segments can be adjusted based on the initial peak, based on the predetermined thresholds of the second segment, and/or based on the tissue response in the second segment. In accordance with the present disclosure, the thresholds of the third segment can be set higher than the previous segment to ensure the completion of the firing, Further to the above, upon completion of the firing stroke, the firing assembly is returned by the motor assembly 110 to a home position. The control circuit 100 may remove, or adjust the predetermined thresholds to a maximum, during the return of the firing assembly.

Examples of the method according to various aspects of the present disclosure are provided below in the following numbered clauses. An aspect of the method may include any one or more than one, and any combination of, the numbered clauses described below.

Clause 1—A surgical system (5) is provided. The surgical system (5) is for use in a surgical procedure to perform sequential firings of staple cartridges (22), the sequential firings including a first firing that deploys first staples (25) into a first tissue portion from a first staple cartridge (22), and a second firing that deploys second staples (25) into a second tissue portion from a second staple cartridge (22). The surgical system comprises an end effector (20), a motor (110), a drive shaft (40) operably coupled to the motor (110), and a control circuit (100) coupled to the motor (110). The end effector (20) comprises a first jaw and a second jaw movable relative to the first jaw to transition the end effector (20) from an open configuration to a closed configuration. The motor (110) is to motivate the drive shaft (40) to effect a firing motion at the end effector (20) and the control circuit (100) is to monitor a parameter indicative of a tissue response associated with the first firing, assess the tissue response based on the parameter, and adjust an operational parameter associated with the second firing based on the tissue response during the first firing.

Clause 2—The surgical system (5) of Clause 1, wherein the tissue response is a first tissue response assessed during a first segment of the first firing, wherein the control circuit (100) is to implement a first adjustment to an output of the motor (110) based on the first tissue response during the first segment of the first firing, and implement a second adjustment to the output of the motor (110) during a second segment of the first firing, wherein the second segment is distal to the first segment, and wherein the second adjustment is based on an effectiveness of the first adjustment.

Clause 3—The surgical system (5) of Clause 1 or 2, further comprising a sensor (120) coupled to the control circuit (100), wherein assessing the tissue response based on the parameter comprises comparing a reading of the sensor (120) to a predetermined threshold.

Clause 4—The surgical system (5) of any one of Clauses 1, 2, or 3, wherein the parameter is a force exerted against the drive shaft (40).

Clause 5—The surgical system (5) of any one of Clauses 1, 2, 3, or 4, wherein to adjust the operational parameter, the control circuit (100) is to change a clamp time in the second firing.

Clause 6—The surgical system (5) of any one of Clauses 1, 2, 3, or 4, wherein to adjust the operational parameter, the control circuit (100) is to adjust a predetermined threshold.

Clause 7—The surgical system (5) of any one of Clauses 1, 2, 3, 4, 5, or 6, further comprising a user interface (140) coupled to the control circuit (100), wherein adjusting the operational parameter is conditioned upon the control circuit (100) receiving an adjustment approval through the user interface (140).

Clause 8—The surgical system (5) of any one of Clauses 1, 2, 3, 4, 5, 6, or 7, wherein to adjust the operational parameter associated with the second firing, the control circuit (100) is to detect an identifier of the second staple cartridge (22), determine a staple cartridge type of the second staple cartridge (22) based on the identifier, and recommend a different staple cartridge (22) type for the second firing based on the tissue response in the first firing.

Clause 9—The surgical system (5) of Clause 8, wherein the different staple cartridge type comprises a different staple-size than the second staple cartridge (22).

Clause 10—The surgical system (5) of Clause 8, further comprising a user interface (140) coupled to the control circuit (100), wherein adjusting of operational parameter further comprises the control circuit (100) modifying the operational parameter in response to an override input through the user interface (140).

Clause 11—The surgical system (5) of any one of Clauses 1, 2, 3, 4, 5, 6, 7, 8, 9 or 10, wherein to monitor the parameter, the control circuit (100) is to determine a first value of the parameter at a proximal portion of the first firing, and determine a second value of the parameter at a distal portion of the first firing.

Clause 12—The surgical system (5) of any one of Clauses 1, 2, 3, 4, 5, 6, 7, 8, 9, 10 or 11, wherein the first firing comprises a proximal firing region and a distal firing region, wherein assessing the tissue response comprises determining a change in the tissue response between the proximal firing region and the distal firing region.

Clause 13—The surgical system (5) of Clause 12, wherein adjusting the operational parameter associated with the second firing is based on the change in the tissue response between the proximal firing region and the distal firing region.

Clause 14—The surgical system (5) of any one of Clauses 1, 2, 3, 4, 5, 6, 7, 8, 9, 10, 11, 12, or 13, wherein the control circuit (100) is configured to further adjust the operational parameter associated with the second firing based on a temperature of the motor (110) measured during the first firing.

Clause 15—The surgical system (5) of any one of Clauses 1, 2, 3, 4, 5, 6, 7, 8, 9, 10, 11, 12, 13, or 14, further comprising a battery for powering the motor (110), wherein the control circuit (100) is to further adjust the operational parameter associated with the second firing based on a voltage condition of the battery during the first firing.

Clause 16—A surgical system (5) is provided. The surgical system (5) is for use in a surgical procedure to perform sequential firings of staple cartridges (22), the sequential firings including a first firing that deploys first staples (25) into a first tissue portion from a first staple cartridge (22), and a second firing that deploys second staples (25) into a second tissue portion from a second staple cartridge (22). The surgical system comprises an end effector (20), a motor (110), a drive shaft (40) operably coupled to the motor (110), and a control circuit (100) coupled to the motor (110). The end effector (20) comprises a first jaw and a second jaw movable relative to the first jaw to transition the end effector (20) from an open configuration to a closed configuration. The motor (110) is configured to motivate the drive shaft (40) to effect a firing motion at the end effector (20), and the control circuit (100) is to detect a tissue response associated with the first firing, and adjust a setting of the surgical system (5) for use with the second firing based on the tissue response during the first firing.

Clause 17—A surgical system (5) is provided. The surgical system (5) is for use in a surgical procedure to perform sequential firings of staple cartridges (22). The surgical system comprises an end effector (20), a motor (110), a drive shaft (40) operably coupled to the motor (110), and a control circuit (100) coupled to the motor (110). The end effector (20) comprises a first jaw and a second jaw movable relative to the first jaw to transition the end effector (20) from an open configuration to a closed configuration. The motor (110) is configured to motivate the drive shaft (40) to effect a firing motion at the end effector (20), and the control circuit (100) is to detect that the surgical procedure involves sequential firings, wherein the sequential firings include a first firing that deploys first staples (25) into a first tissue portion from a first staple cartridge (22), and a second firing that deploys second staples (25) into a second tissue portion from a second staple cartridge (22), update a firing algorithm previously utilized with the first firing based on a tissue response during the first firing, and execute the updated firing algorithm in the second firing.

Clause 18—The surgical system (5) of Clause 17, further comprising a user interface (140) coupled to the control circuit (100), wherein updating of a firing algorithm previously utilized with the first firing is conditioned upon the control circuit (100) receiving an adjustment approval through the user interface (140).

Clause 19—The surgical system (5) of Clause 17 or 18, wherein to update a firing algorithm, the control circuit (100) is to determine the acceptability of the tissue response during the first firing, and recommend a modification of a motor (110) voltage parameter based on the acceptability of the tissue response during the first firing.

Clause 20—The surgical system of any one of Clauses 17, 18, or 19, wherein the updating of a firing algorithm further comprises the control circuit (100) updating a firing algorithm in response to an override input through the user interface (140).

Clause 21—A surgical system is provided. The surgical system is for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is to motivate the drive shaft to effect a firing motion at the end effector and the control circuit is to monitor a parameter indicative of a tissue response associated with the first firing, assess the tissue response based on the parameter, and adjust an operational parameter associated with the second firing based on the tissue response during the first firing.

Clause 22—The surgical system of Clause 21, wherein the tissue response is a first tissue response assessed during a first segment of the first firing, wherein the control circuit is to implement a first adjustment to an output of the motor based on the first tissue response during the first segment of the first firing, and implement a second adjustment to the output of the motor during a second segment of the first firing, wherein the second segment is distal to the first segment, and wherein the second adjustment is based on an effectiveness of the first adjustment.

Clause 23—The surgical system of Clause 21 or 22, further comprising a sensor coupled to the control circuit, wherein assessing the tissue response based on the parameter comprises comparing a reading of the sensor to a predetermined threshold.

Clause 24—The surgical system of any one of Clauses 21, 22, or 23, wherein the parameter is a force exerted against the drive shaft.

Clause 25—The surgical system of any one of Clauses 21, 22, 23, or 24, wherein to adjust the operational parameter, the control circuit is to change a clamp time in the second firing.

Clause 26—The surgical system of any one of Clauses 21, 22, 23, or 24, wherein to adjust the operational parameter, the control circuit is to adjust a predetermined threshold.

Clause 27—The surgical system of any one of Clauses 21, 22, 23, 24, 25, or 26, further comprising a user interface coupled to the control circuit, wherein adjusting the operational parameter is conditioned upon the control circuit receiving an adjustment approval through the user interface.

Clause 28—The surgical system of any one of Clauses 21, 22, 23, 24, 25, 26, or 27, wherein to adjust the operational parameter associated with the second firing, the control circuit is to detect an identifier of the second staple cartridge, determine a staple cartridge type of the second staple cartridge based on the identifier, and recommend a different staple cartridge type for the second firing based on the tissue response in the first firing.

Clause 29—The surgical system of Clause 28, wherein the different staple cartridge type comprises a different staple-size than the second staple cartridge.

Clause 30—The surgical system of Clause 28, further comprising a user interface coupled to the control circuit, wherein adjusting of operational parameter further comprises the control circuit modifying the operational parameter in response to an override input through the user interface.

Clause 31—The surgical system of any one of Clauses 21, 22, 23, 24, 25, 26, 27, 28, 29 or 30, wherein to monitor the parameter, the control circuit is to determine a first value of the parameter at a proximal portion of the first firing, and determine a second value of the parameter at a distal portion of the first firing.

Clause 32—The surgical system of any one of Clauses 21, 22, 23, 24, 25, 26, 27, 28, 29, 30, or 31, wherein the first firing comprises a proximal firing region and a distal firing region, wherein assessing the tissue response comprises determining a change in the tissue response between the proximal firing region and the distal firing region.

Clause 33—The surgical system of Clause 32, wherein adjusting the operational parameter associated with the second firing is based on the change in the tissue response between the proximal firing region and the distal firing region.

Clause 34—The surgical system of any one of Clauses 21, 22, 23, 24, 25, 26, 27, 28, 29, 30, 31, 32, or 33, wherein the control circuit is configured to further adjust the operational parameter associated with the second firing based on a temperature of the motor measured during the first firing.

Clause 35—The surgical system of any one of Clauses 21, 22, 23, 24, 25, 26, 27, 28, 29, 30, 31, 32, 33, or 34, further comprising a battery for powering the motor, wherein the control circuit is to further adjust the operational parameter associated with the second firing based on a voltage condition of the battery during the first firing.

Clause 36-A surgical system is provided. The surgical system is for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is configured to motivate the drive shaft to effect a firing motion at the end effector, and the control circuit is to detect a tissue response associated with the first firing, and adjust a setting of the surgical system for use with the second firing based on the tissue response during the first firing.

Clause 37—A surgical system is provided. The surgical system is for use in a surgical procedure to perform sequential firings of staple cartridges. The surgical system comprises an end effector, a motor, a drive shaft operably coupled to the motor, and a control circuit coupled to the motor. The end effector comprises a first jaw and a second jaw movable relative to the first jaw to transition the end effector from an open configuration to a closed configuration. The motor is configured to motivate the drive shaft to effect a firing motion at the end effector, and the control circuit is to detect that the surgical procedure involves sequential firings, wherein the sequential firings include a first firing that deploys first staples into a first tissue portion from a first staple cartridge, and a second firing that deploys second staples into a second tissue portion from a second staple cartridge, update a firing algorithm previously utilized with the first firing based on a tissue response during the first firing, and execute the updated firing algorithm in the second firing.

Clause 38—The surgical system of Clause 37, further comprising a user interface coupled to the control circuit, wherein updating of a firing algorithm previously utilized with the first firing is conditioned upon the control circuit receiving an adjustment approval through the user interface.

Clause 39—The surgical system 5 of Clause 37 or 38, wherein to update a firing algorithm, the control circuit is to determine the acceptability of the tissue response during the first firing, and recommend a modification of a motor voltage parameter based on the acceptability of the tissue response during the first firing.

Clause 40—The surgical system of any one of Clauses 37, 38, or 39, wherein the updating of a firing algorithm further comprises the control circuit updating a firing algorithm in response to an override input through the user interface. It is worthy to note that any reference numbers included in the appended claims are used to reference exemplary embodiments/elements described in the present disclosure.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more than one" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more than one" or "at least one" and indefinite articles such as "a" or "an" (e.g., "a" and/or "an" should typically be interpreted to mean "at least one" or "one or more than one"); the same holds true for the use of definite articles used to introduce claim recitations. The singular form of "a", "an", and "the" include the plural references unless the context clearly dictates otherwise.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

It is worthy to note that any reference numbers included in the appended claims are used to reference exemplary embodiments/elements described in the present disclosure. Accordingly, any such reference numbers are not meant to limit the scope of the subject matter recited in the appended claims.

What is claimed is:

1. A surgical system for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge, the surgical system comprising:
   an end effector, comprising:
     a first jaw; and
     a second jaw movable relative to the first jaw to transition the end effector from an open configuration to a closed configuration;
   a motor;
   a drive shaft operably coupled to the motor, wherein the motor is to motivate the drive shaft to effect a firing motion at the end effector; and
   a control circuit coupled to the motor, wherein the control circuit is to:
     monitor a parameter indicative of a tissue response associated with the first firing, wherein the tissue response is a first tissue response assessed during a first segment of the first firing;
     assess the tissue response based on the parameter;
     implement a first adjustment to an output of the motor based on the first tissue response during the first segment of the first firing;
     implement a second adjustment to the output of the motor during a second segment of the first firing, wherein the second segment is distal to the first segment, and wherein the second adjustment is based on an effectiveness of the first adjustment; and
     adjust an operational parameter associated with the second firing based on the tissue response during the first firing.

2. The surgical system of claim 1, further comprising a sensor coupled to the control circuit, wherein assessing the tissue response based on the parameter comprises comparing a reading of the sensor to a predetermined threshold.

3. The surgical system of claim 1, wherein the parameter is a force exerted against the drive shaft.

4. The surgical system of claim 1, wherein to adjust the operational parameter, the control circuit is to change a clamp time in the second firing.

5. The surgical system of claim 1, wherein to adjust the operational parameter, the control circuit is to adjust a predetermined threshold.

6. The surgical system of claim 1, further comprising a user interface coupled to the control circuit, wherein adjusting the operational parameter is conditioned upon the control circuit receiving an adjustment approval through the user interface.

7. The surgical system of claim 1, wherein to adjust the operational parameter associated with the second firing, the control circuit is to:
   detect an identifier of the second staple cartridge;
   determine a staple cartridge type of the second staple cartridge based on the identifier; and recommend a different staple cartridge type for the second firing based on the tissue response in the first firing.

8. The surgical system of claim 7, wherein the different staple cartridge type comprises a different staple-size than the second staple cartridge.

9. The surgical system of claim 7, further comprising a user interface coupled to the control circuit, wherein adjusting of operational parameter further comprises the control circuit modifying the operational parameter in response to an override input through the user interface.

10. The surgical system of claim 1, wherein to monitor the parameter, the control circuit is to:
determine a first value of the parameter at a proximal portion of the first firing; and
determine a second value of the parameter at a distal portion of the first firing.

11. The surgical system of claim 1, wherein the first firing comprises a proximal firing region and a distal firing region, wherein assessing the tissue response comprises determining a change in the tissue response between the proximal firing region and the distal firing region.

12. The surgical system of claim 11, wherein adjusting the operational parameter associated with the second firing is based on the change in the tissue response between the proximal firing region and the distal firing region.

13. The surgical system of claim 1, wherein the control circuit is configured to further adjust the operational parameter associated with the second firing based on a temperature of the motor measured during the first firing.

14. The surgical system of claim 1, further comprising a battery for powering the motor, wherein the control circuit is to further adjust the operational parameter associated with the second firing based on a voltage condition of the battery during the first firing.

15. A surgical system for use in a surgical procedure to perform sequential firings of staple cartridges, the sequential firings including a first firing that deploys first staples into a first tissue portion from a first staple cartridge, and a second firing that deploys second staples into a second tissue portion from a second staple cartridge, the surgical system comprising:
an end effector, comprising:
a first jaw; and
a second jaw movable relative to the first jaw to transition the end effector from an open configuration to a closed configuration;
a motor;
a drive shaft operably coupled to the motor, wherein the motor is configured to motivate the drive shaft to effect a firing motion at the end effector; and
a control circuit coupled to the motor, wherein the control circuit is to:
detect a tissue response associated with the first firing, wherein the tissue response is a first tissue response assessed during a first segment of the first firing;
implement a first adjustment to an output of the motor based on the first tissue response during the first segment of the first firing;
implement a second adjustment to the output of the motor during a second segment of the first firing, wherein the second segment is distal to the first segment, and wherein the second adjustment is based on an effectiveness of the first adjustment; and
adjust a setting of the surgical system for use with the second firing based on the tissue response during the first firing.

16. A surgical system for use in a surgical procedure to perform sequential firings of staple cartridges, the surgical system comprising:
an end effector, comprising:
a first jaw; and
a second jaw movable relative to the first jaw to transition the end effector from an open configuration to a closed configuration;
a motor;
a drive shaft operably coupled to the motor, wherein the motor is configured to motivate the drive shaft to effect a firing motion at the end effector; and
a control circuit coupled to the motor, wherein the control circuit is to:
detect that the surgical procedure involves sequential firings, wherein the sequential firings include a first firing that deploys first staples into a first tissue portion from a first staple cartridge and a second firing that deploys second staples into a second tissue portion from a second staple cartridge;
implement a first adjustment to an output of the motor during a first segment of the first firing based on a tissue response assessed during the first segment of the first firing;
implement a second adjustment to the output of the motor during a second segment of the first firing, wherein the second segment is distal to the first segment, and wherein the second adjustment is based on an effectiveness of the first adjustment;
update a firing algorithm previously utilized with the first firing based on the tissue response during the first firing; and
execute the updated firing algorithm in the second firing.

17. The surgical system of claim 16, further comprising a user interface coupled to the control circuit, wherein updating of a firing algorithm previously utilized with the first firing is conditioned upon the control circuit receiving an adjustment approval through the user interface.

18. The surgical system of claim 16, wherein to update a firing algorithm, the control circuit is to:
determine an acceptability of the tissue response during the first firing; and
recommend a modification of a motor voltage parameter based on the acceptability of the tissue response during the first firing.

19. The surgical system of claim 16, further comprising a user interface coupled to the control circuit, wherein the updating of a firing algorithm further comprises the control circuit updating a firing algorithm in response to an override input through the user interface.

* * * * *